United States Patent [19]
Toyomura

[11] Patent Number: 5,769,470
[45] Date of Patent: Jun. 23, 1998

[54] CONTAINING DOOR LOCK PIN

[75] Inventor: Mitsuo Toyomura, Kobe, Japan

[73] Assignee: Toyomura Marine Engineering Co., Ltd., Hyogo, Japan

[21] Appl. No.: 749,840

[22] Filed: Nov. 15, 1996

[30] Foreign Application Priority Data

Nov. 25, 1995 [JP] Japan .................................. 7-329497

[51] Int. Cl.$^6$ .................................................. E05B 39/02
[52] U.S. Cl. ........................................ 292/327; 292/287
[58] Field of Search .................................. 292/327, 287; 411/353, 14

[56] References Cited

U.S. PATENT DOCUMENTS

| | | | |
|---|---|---|---|
| 1,397,101 | 11/1921 | Kelly | 292/327 |
| 2,033,371 | 3/1936 | Benaggio | 292/327 |
| 2,228,738 | 1/1941 | Thomson | 292/327 |
| 2,319,753 | 5/1943 | Smith | 292/327 |

FOREIGN PATENT DOCUMENTS

| | | | |
|---|---|---|---|
| 330460 | 12/1920 | Germany | 292/327 |

*Primary Examiner*—Steven N. Meyers
*Assistant Examiner*—Gary Estremsky
*Attorney, Agent, or Firm*—Beveridge, DeGrandi, Weilacher &Young, L.L.P.

[57] ABSTRACT

The present invention provides a container door lock pin which includes a bolt and a nut, which can lock a container door by simply pushing the bolt into the nut without needing to screw it in, and which makes it possible to visually confirm locking. The bolt has a head at its rear end and a shank. The shank has an annular groove formed in its periphery at the first position spaced from the bolt front end by a first distance. A ring spring is fitted in the groove. The nut has a bore for slidable engagement with the shank. The bore has a first annular groove formed near the nut front end. An elastic rigid confirmation seal plate is fitted in the first groove. The bore includes a cylindrical portion, which extends between the first groove and the second position spaced rearward from the first groove by a second distance, and a conical portion, which extends between the second position and the nut rear end. The cylindrical portion has a diameter adapted for slidable engagement with the shank, and a second annular groove for engagement with the spring. The second groove is formed at the third position spaced rearward from the first groove by a third distance, which is shorter than the first distance between the bolt front end and the bolt groove. The conical portion widens rearward.

2 Claims, 7 Drawing Sheets

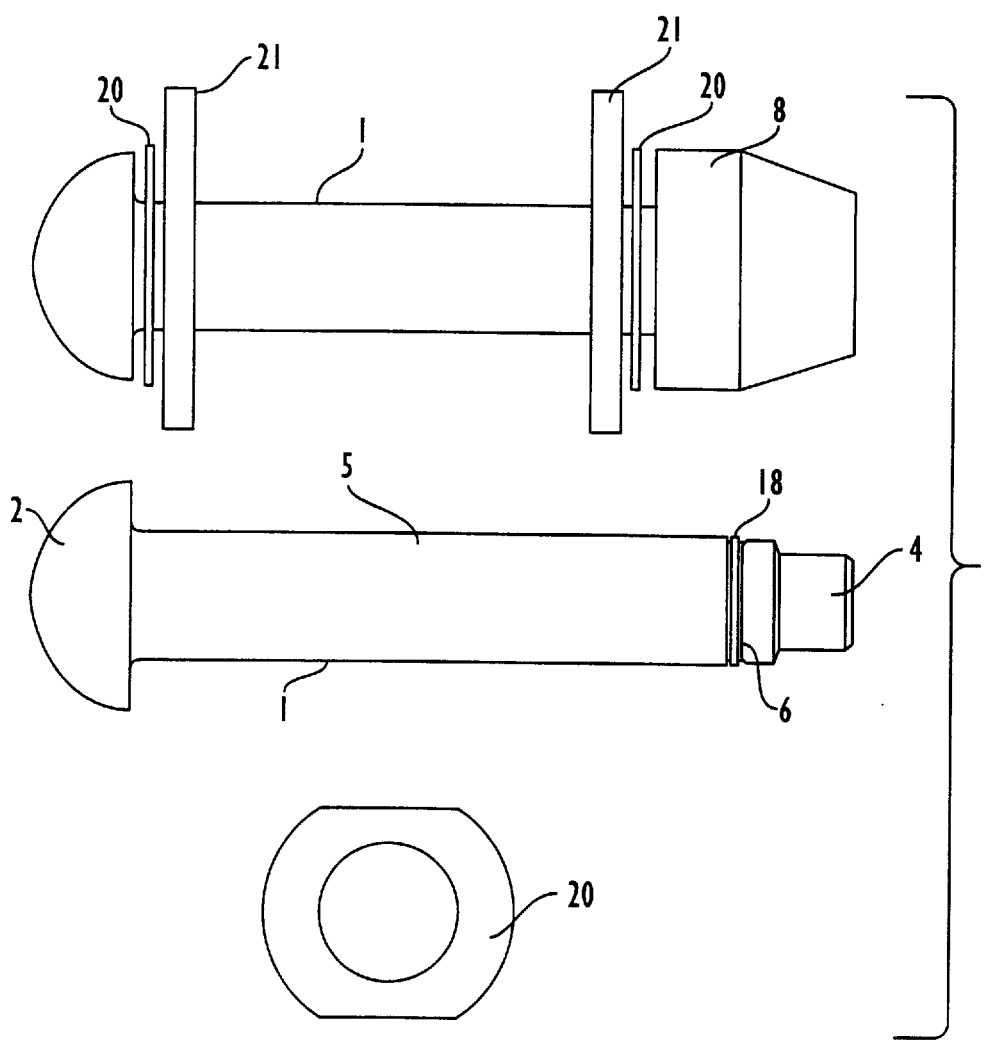

CONTAINING DOOR LOCK PIN

FIELD AND BACKGROUND OF THE INVENTION

The present invention relates to a pin for locking a door of a shipping container.

Conventionally, the doors of shipping containers have been locked, as well known, by inserting a locking handle or bar into a holder and then engaging a bolt or a screw type lock pin with the holder. Many such bolts or pins were broken while the containers were transported over a long distance. Many such doors were unlocked intentionally and contents of the containers were stolen.

Therefore, the inventors invented a screw, which includes a bolt, a nut and a ring spring, for easily locking a container door by only engaging the bolt and nut with each other. The bolt has an annular groove in which the spring is fitted. The nut has an outward widening conical bore and a cylindrical bore, which has an annular groove. As the bolt moves into the nut, the conical wall contracts the spring. When the spring has reached the bore groove, it expands to prevent the bolt and nut from moving axially relatively to each other. After the male thread passes through the female thread, the bolt and nut are idle relatively to each other. It is difficult to unlock the door, but the bolt needs rotating for engagement with the nut to lock the door. The engagement requires a tool and time. In addition, it is not possible with the screw to confirm the locking condition visually and clearly.

SUMMARY OF THE INVENTION

In view of the above problems, it is the object of the present invention to provide a pin including a bolt and a nut, which can lock a container door by simply pushing the bolt into the nut without needing to screw it in, and which makes it possible to visually confirm locking.

A container door lock pin in one aspect of the invention includes a bolt 1 having a head 2 at its rear end and a shank 3 (FIG. 1). The shank 3 has an annular groove 6 formed in its periphery at the first position B (FIG. 2) spaced from the bolt front end 7 by a first distance X. A ring spring 18 is fitted in the groove 6. The pin further includes (FIG. 5) a nut 8 having a bore 9 for slidable engagement with the shank 3. The bore 9 has a first annular groove 11 formed near the nut front end 10. An elastic rigid confirmation seal plate 19 is fitted in the first groove 11 (FIG. 6). The bore 9 includes a cylindrical portion 13, which extends between the first groove 11 and the second position D spaced rearward from the first groove by a second distance Y, and a conical portion 15, which extends between the second position D and the nut rear end 17. The cylindrical portion 13 has a diameter adapted for slidable engagement wish the shank 3, and a second annular groove 14 for engagement with the spring 18. The second groove 14 is formed at the third position E spaced rearward from the first groove 11 by a third distance Z, which is shorter than the first distance X between the bolt front end 7 and the bolt groove 6. The conical portion 15 widens rearward.

A container door lock pin, in another aspect of the invention, includes a bolt 1 having a head 2 and a shank 3 (FIG. 4). The shank 3 includes a front portion 4, which extends between the bolt front end 7 and the first position A spaced from the front end 7 by a first distance X, and a rear portion 5, which extends between the first position A and the head 2. The rear portion 5 is larger in diameter than the front portion 4, and has an annular groove 6 formed in its periphery at the second position B spaced rearward from the first position A by a second distance N. A ring spring 18 is fitted in the groove 6. The pin further includes a nut 8 having a bore 9 for slidable engagement with the shank 3. The bore 9 has a first annular groove 11 formed near the nut front end 10. An elastic rigid confirmation seal plate 19 is fitted in the first groove 11. The bore 9 includes a first cylindrical portion 12 (FIGS. 5 and 6), which extends between the first groove 11 and the third position C spaced rearward from the first groove 11 by a certain distance, a second cylindrical portion 13, which extends between the third position C and the fourth position D spaced rearward from the third position C by a certain distance, and a conical portion 15, which extends between the fourth position D and the nut rear end 17. The first cylindrical portion 12 is smaller in diameter than the second cylindrical portion 13, and has a diameter adapted for slidable engagement with the bolt front portion 4. The second cylindrical portion 13 has a diameter adapted for slidable engagement with the bolt rear portion 5, and a second annular groove 14 for engagement with the spring 18. The second groove 14 is formed at the fifth position E spaced rearward from the first groove 11 by a certain distance, which is shorter than the distance M+N between the bolt front end 7 and the bolt groove 6. The conical portion 15 widens rearward.

BRIEF DESCRIPTION OF THE DRAWINGS

Preferred embodiments of the present invention will be described in detail with reference to the accompanying drawings, in which:

FIG. 7 is a front end view of the bolt of the first embodiment with the ring spring fitted on the bolt;

FIG. 8 shows a container door lock pin of the invention locking a pair of brackets on a container door, the bolt of the second embodiment with the ring spring thereof fitted on the bolt, and washers;

DETAILED DESCRIPTION OF THE EMBODIMENTS

Figure 1:
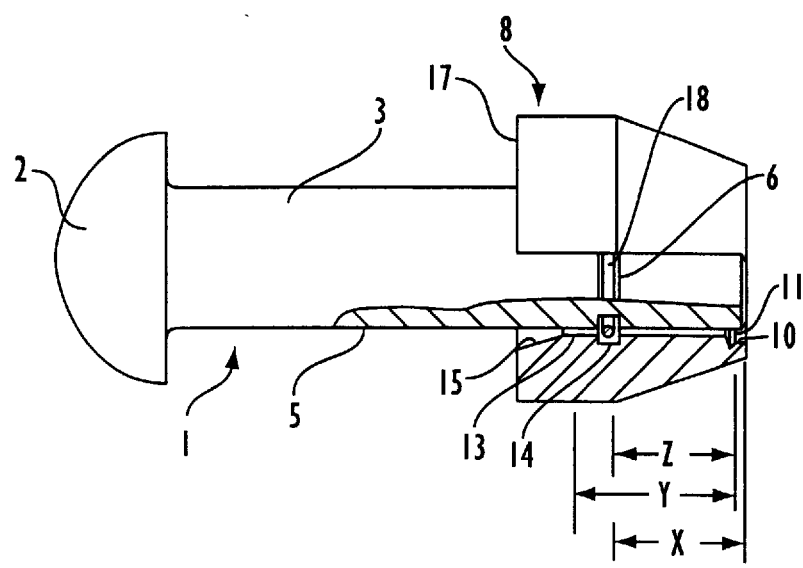
FIG. 1 is a side view partially broken of a container door lock pin according to the first embodiment, showing the bolt and nut thereof in engagement.
Figure 2:
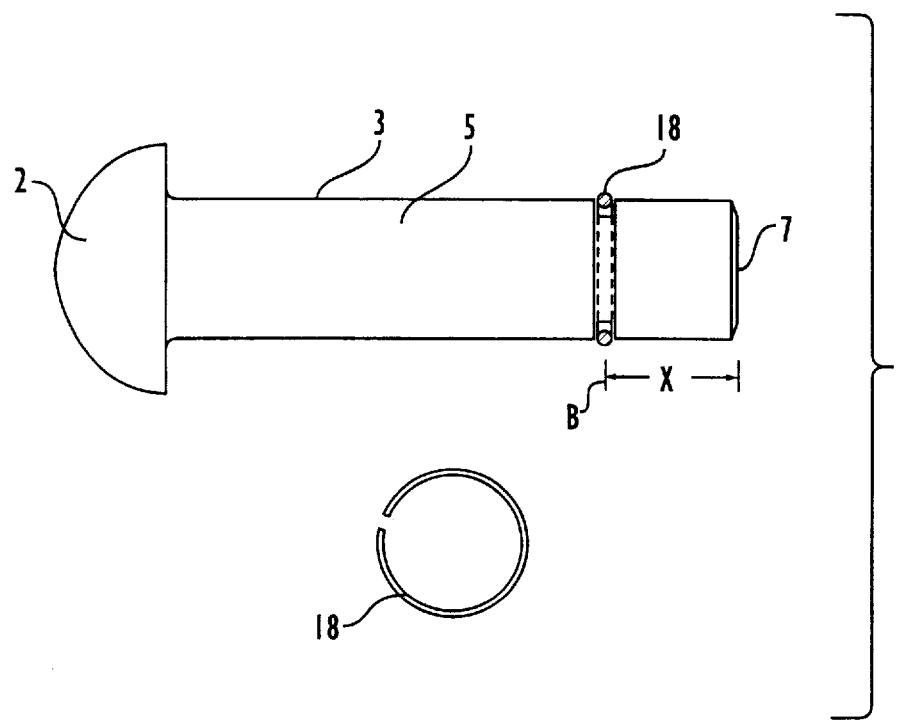
FIG. 2 shows the bolt and ring spring of the first embodiment.
Figure 3:
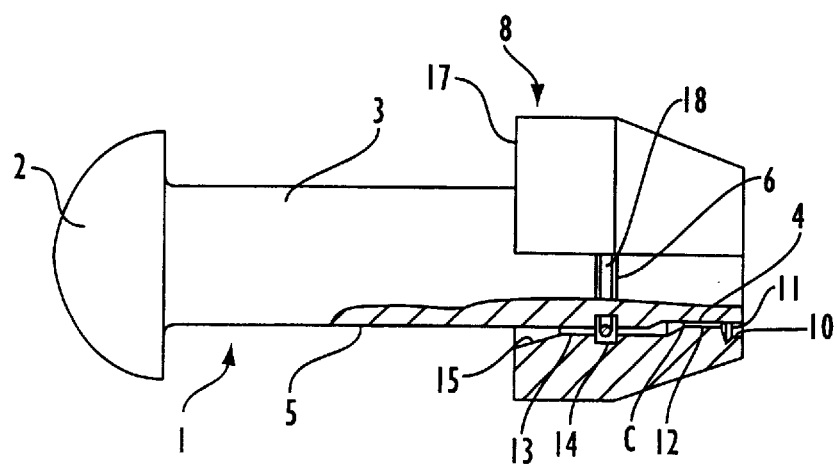
FIG. 3 is a side view partially broken of a container door lock pin according to the second embodiment, showing the bolt and nut thereof in engagement.
Figure 4:
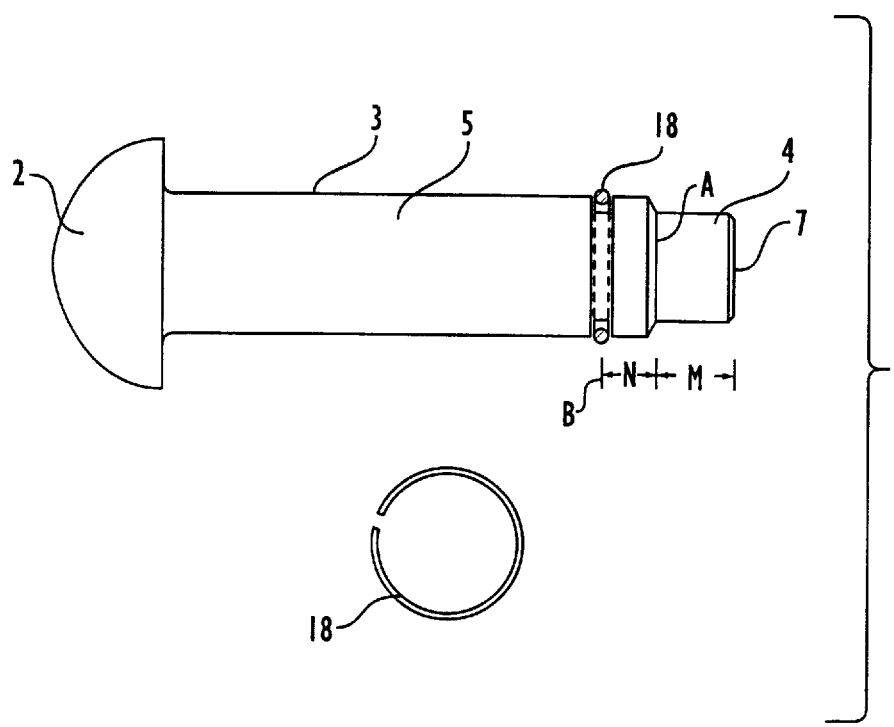
FIG. 4 shows the bolt and ring spring of the second embodiment.

With reference to FIGS. 1–4, the container door lock pin of each embodiment includes a bolt 1 and a nut 8. The bolt 1 includes a head 2 and a shank 3, which has a circular cross section, and which is not threaded. As shown in FIG. 2, the shank 3 of the first embodiment has a constant diameter along its length. As shown in FIG. 4, the shank 3 of the second embodiment includes a front portion 4 and a rear portion 5. The front portion 4 extends between the front end 7 of the bolt 1 and the position A spaced rearward from the end 7 by a certain distance M. The rear portion 5 extends between the position A and the head 2. The front portion 4 is smaller in diameter than the rear portion 5. The portions 4 and 5 are interconnected by a conical portion at the position A. The shank 3 of the first embodiment has an annular groove 6 formed in its periphery at the position B spaced rearward from the end 7 by a certain distance X. The rear portion 5 of the shank 3 of the second embodiment has an annular groove 6 formed in its periphery at the position B spaced rearward from the position A by a certain distance N. A ring spring 18 engages with each groove 6. The diameter of the shank 3 of the first embodiment is larger than the inner diameter of the associated spring 18, but smaller than the outer diameter. The diameter of the shank portion 5 of the second embodiment is larger than the inner diameter of the associated spring 18, but smaller than the outer diameter. Each spring 18 is made of spring wire of certain length, which is curved annularly and spaced between its both ends. The wire radius of each spring 18 is smaller than the depth of the associated groove 6. Once each spring 18 engages with the associated groove 6, it is axially fixed.

Figure 5A:
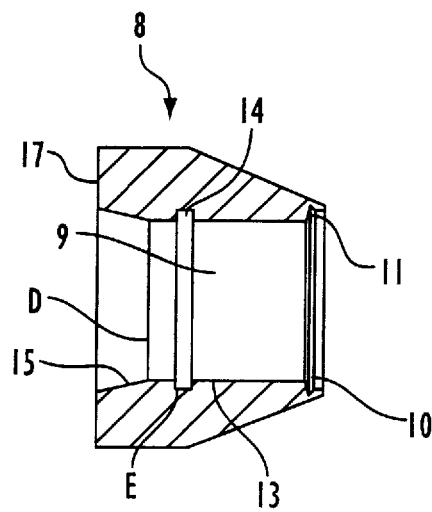
FIG. 5(a) is an axial cross section of the nut of the first embodiment.
Figure 5B:
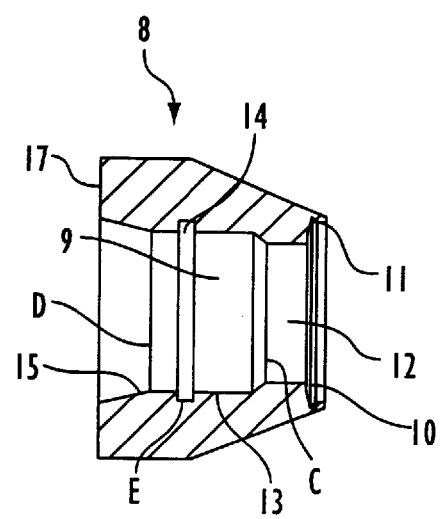
FIG. 5(b) is an axial cross section of the nut of the second embodiment.
Figure 6:
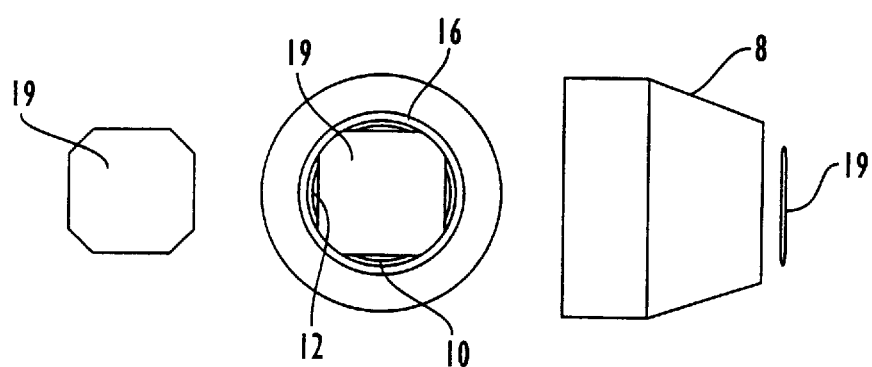
FIG. 6 shows the nut and confirmation seal plate of each embodiment, and includes a rear end view of the nut with the plate fitted therein.

As shown in FIGS. 5(a) and 5(b), the nut 8 of each embodiment has a bore 9, which is not tapped, for engagement with the associated bolt shank 3. The bore 9 has an annular groove 11 formed near its front end 10 for engagement with a confirmation seal plate 19 (FIG. 6). As shown in FIG. 5(a), the bore 9 of the first embodiment includes a cylindrical portion 13 extending between the groove 11 and a position D, and a conical portion 15 extending between the position D and the rear end 17 of the nut 8. The cylindrical portion 13 has a diameter adapted for slidable engagement with the associated bolt shank 3. The cylindrical portion 13 has an annular groove 14 for engagement with the associated ring spring 18. This groove 14 is formed at the position E spaced rearward from the groove 11 by a certain distance Z (FIG. 1). As shown in FIG. 5(b), the nut bore 9 of the second embodiment includes an outer cylindrical portion 12 extending between the groove 11 and a position C, an inner cylindrical portion 13 extending between the position C and a position D, and a conical portion 15 extending between the position D and the rear end 17 of the nut 8. The cylindrical portions 12 and 13 are interconnected by a conical port-on at the position C. The outer cylindrical portion 12 has a diameter adapted for slidable engagement with the front portion 4 of the associated bolt shank 3. The inner cylindrical portion 13 has a diameter larger than that of the outer portion 12 and adapted for slidable engagement with the rear shank portion 5. The inner portion 13 has an annular groove 14 for engagement with the associated ring spring 18. This groove 14 is formed at the position E spaced rearward from the groove 11 by the distance which is the size of M plus N (between bolt end 7 and spring groove 6) minus 1 through 2 mm. Each conical portion 15 diverges toward the rear end 17.

With reference to FIG. 6, the confirmation seal plate 19 is a square, thin, elastic and rigid plate. The corners of the plate 19 are fitted in the annular groove 11 of the associated nut 8 and supported at the four points by the nut 8. The plate corners are chamfered or rounded for sufficient engagement with the groove 11. By thus fitting the four corners, it is possible to remove the plate 19 easily from the groove 11 when the associated bolt 1 is inserted into the nut 8.

The parts of each embodiment are made of stainless steel, which is not rusted by wind and rain for a long time. In particular, the bolt 1 and nut 8 should be made of SUS-303, while the confirmation seal plate 19 and ring spring 18 should be made of SUS-304.

Figure 9A:
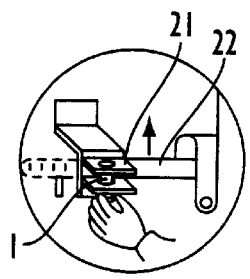
FIGS. 9(a)–9(c) show how to use a container door lock pin of the invention.
Figure 9B:
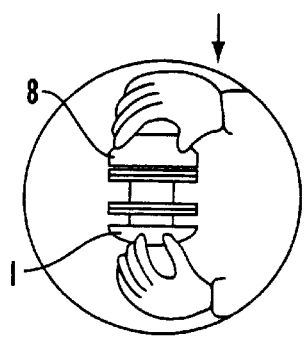
Figure 9C:
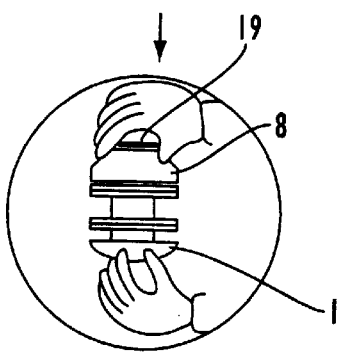
Figure 10:
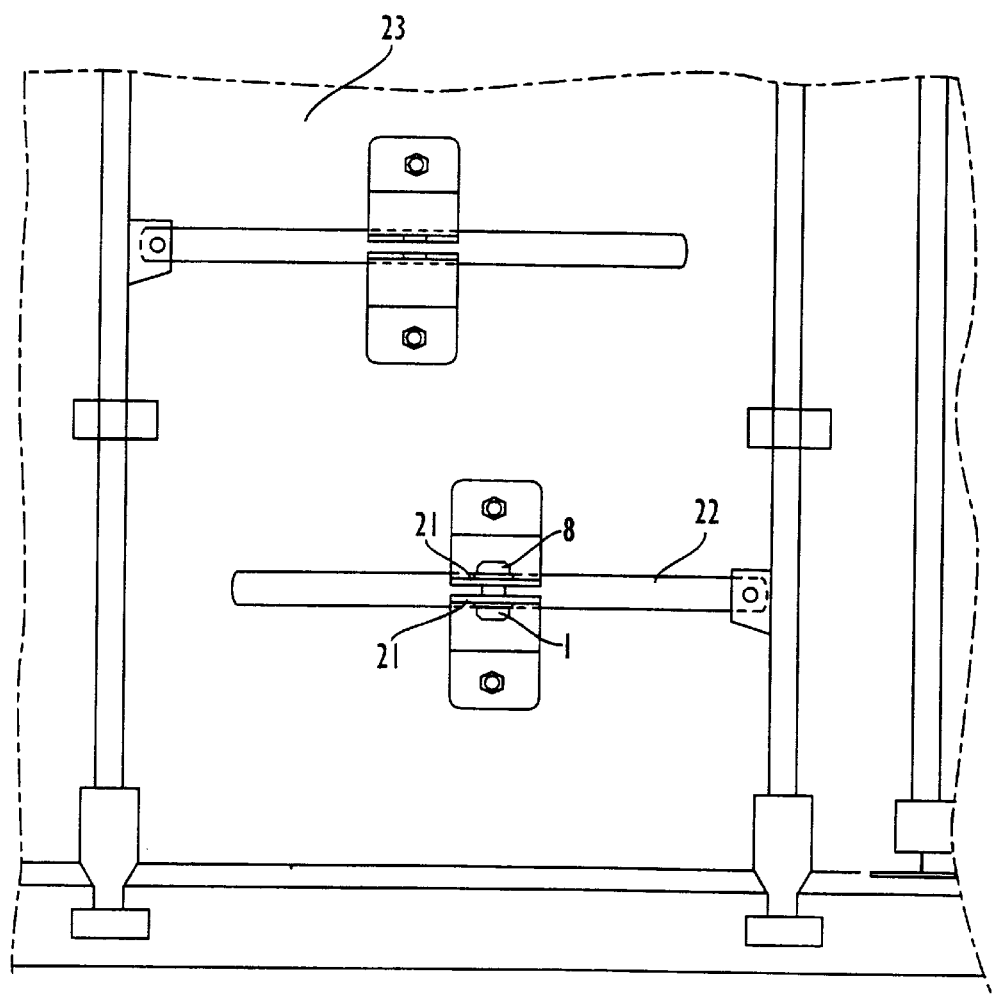
FIG. 10 shows a container door lock pin of the invention locking a container door.
Figure 11:
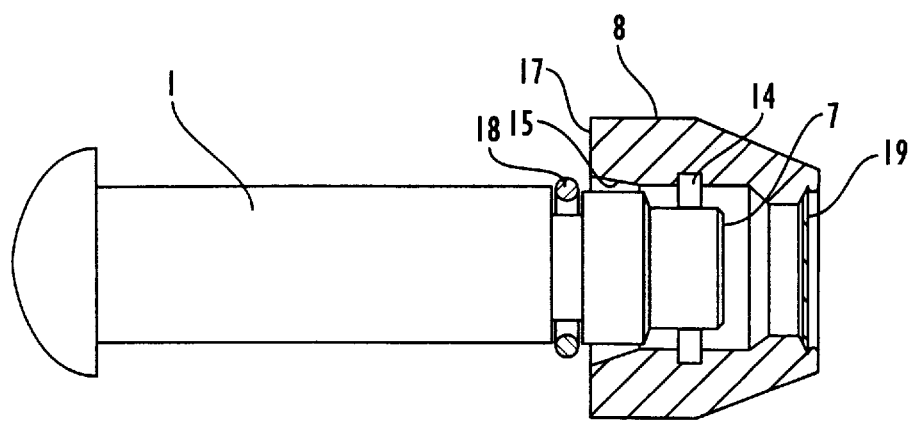
FIGS. 11–13 are side views partially in axial cross section of the container door lock pin of the second embodiment, showing the parts in various relative positions.
Figure 12:
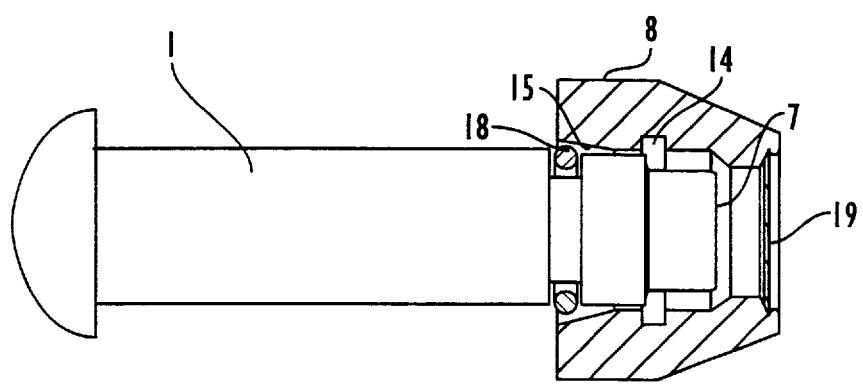
Figure 13:
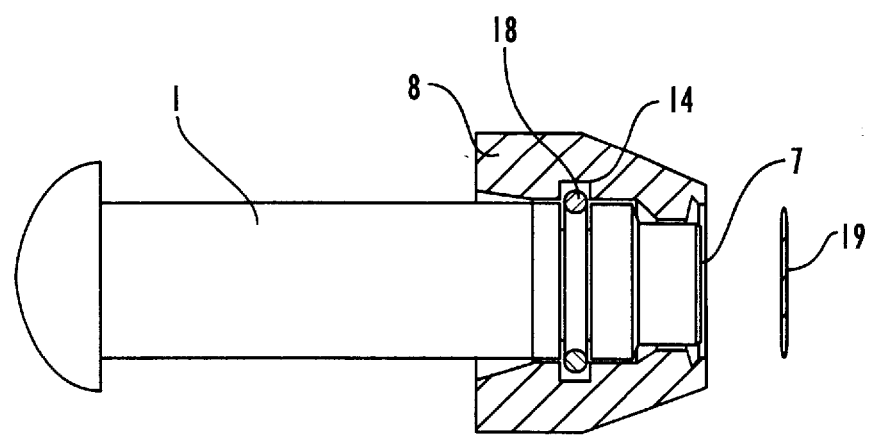

Before the pin of each embodiment can lock a container door 23, as shown in FIG. 10, a container door locking handle 22 is engaged with a pair of brackets 21 on the door in a conventional manner. Then, as shown in FIG. 9(a), the bolt 1 is inserted into the holes of the brackets 21 and washers 20 from below. Then, as shown in FIG. 9(b), the front end of the bolt 1 is inserted into the nut 8 with the confirmation seal plate 19 engaging with the annular groove 11. When the bolt 1 is inserted into the nut 8, as shown in FIG. 11, the ring spring 18 is initially positioned outside the nut rear end 17. As the bolt shank 3 moves deep into the nut bore 9, as shown in FIG. 12, the spring 18 enters the conical bore 15 and moves forward along the conical wall while contracting. The spring 18 then enters the cylindrical bore 13. When the bolt i has reached a locking position as shown in FIG. 13, the bolt front end 7 strikes against the plate 19 and pushes it out of the nut 8, disengaging it from the groove 11, as also shown in FIG. 9(c). At the same time, the spring 18 snaps into the annular groove 14 and expands to its original diameter. As a result, the spring 18 engages with both of the bolt groove 6 and nut groove 14, coupling the bolt 1 and nut 8 together to lock the handle 22 inside the brackets 22. The handle 22 can be unlocked by sawing the pin.

A container door lock pin according to the invention is easier to fit than the conventional lock pins. The force required for inserting the pin is about 3.5 Kg. The pin makes it possible to securely confirm locking. The pin is made of stainless steel, and therefore is not rusted by wind and rain for a long time. The pin is simple in structure, and can therefore be used for various types of container doors. The pin makes (a) seal tape unnecessary by being marked with symbols and/or numerals, so that the goods in a container are safe when it is delivered.

As explained hereinbefore, a container door lock pin according to the invention does not need screwing in as the conventional bolts do for locking. Locking can be made with the pin securely and quickly by simply inserting or forcing in the bolt. The pin needs no particularly large force for locking, and it is therefore easy to lock. When locking is completed, the confirmation seal plate is removed. It is therefore possible to visually confirm locking. This guarantees easy and secure locking.

What is claimed is:

1. A container door lock pin comprising:

a bolt including a head at its rear end and a shank;

the shank having a shank annular groove formed in its periphery at a first position spaced from a bolt front end by a first distance;

a ring spring fitted in the groove;

a nut having a bore for slidable engagement with the shank, the bore having a first annular groove formed near a nut front end; and an elastic rigid confirmation seal plate fitted in the first annular groove;

the bore including a cylindrical portion which extends between the first annular groove and a second position spaced rearward from the first annular groove by a second distance, and a conical portion which extends between the second position and a nut rear end;

the cylindrical portion having a diameter adapted for slidable engagement with the shank, the cylindrical portion also having a second annular groove for engagement with the ring spring;

the second groove being formed at a third position spaced rearward from the first annular groove by a third distance which is shorter than the first distance between the bolt front end and the bolt groove; and the conical portion widening rearwardly.

2. A container door lock pin comprising:

a bolt including a head and a shank;

the shank including a front portion which extends between a bolt front end and a first position spaced from the front end by a first distance, and a rear portion which extends between the first position and the head;

the rear portion being larger in diameter than the front portion, the rear portion having a rear portion annular groove formed in its periphery at a second position spaced rearward from the first position by a second distance;

a ring spring fitted in the groove;

a nut having a bore for slidable engagement with the shank, the bore having a first annular groove formed near the nut front end; and an elastic rigid confirmation seal plate fitted in the first groove;

the bore including a first cylindrical portion, which extends between the first annular groove and a third position spaced rearward from the first annular groove by a certain distance, a second cylindrical portion, which extends between the third position and a fourth position spaced rearward from the third position by a certain distance, and a conical portion, which extends between the fourth position and a nut rear end;

the first cylindrical portion being smaller in diameter than the second cylindrical portion, and having a diameter adapted for slidable engagement with the shank front portion;

the second cylindrical portion 13 having a diameter adapted for slidable engagement with the shank rear portion, the second cylindrical portion also having a second annular groove for engagement with the ring spring;

the second annular groove being formed at a fifth position spaced rearward from the first annular groove by a certain distance, which distance is shorter than the distance between the bolt front end and the rear portion annular groove; and the conical portion widening rearwardly.

* * * * *